(12) United States Patent
Srinivasan et al.

(10) Patent No.: US 11,928,060 B2
(45) Date of Patent: *Mar. 12, 2024

(54) TRANSFER OF CACHELINES IN A PROCESSING SYSTEM BASED ON TRANSFER COSTS

(71) Applicant: ADVANCED MICRO DEVICES, INC., Santa Clara, CA (US)

(72) Inventors: Sriram Srinivasan, Austin, TX (US); John Kelley, Fort Collins, CO (US); Matthew Schoenwald, Fort Collins, CO (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/666,950

(22) Filed: Feb. 8, 2022

(65) Prior Publication Data

US 2022/0237120 A1 Jul. 28, 2022

Related U.S. Application Data

(63) Continuation of application No. 16/700,671, filed on Dec. 2, 2019, now Pat. No. 11,275,688.

(51) Int. Cl.
*G06F 12/084* (2016.01)
(52) U.S. Cl.
CPC .... *G06F 12/084* (2013.01); *G06F 2212/1021* (2013.01); *G06F 2212/1041* (2013.01)

(58) Field of Classification Search
CPC .......... G06F 12/084; G06F 2212/1021; G06F 2212/1041; G06F 12/0888; G06F 2212/1048; G06F 2212/502; G06F 12/0811; G06F 12/0813; G06F 12/0817; G06F 12/0846
See application file for complete search history.

(56) References Cited

U.S. PATENT DOCUMENTS

| | | | |
|---|---|---|---|
| 2007/0156964 A1* | 7/2007 | Sistla | G06F 12/121 711/E12.07 |
| 2014/0032853 A1* | 1/2014 | Lih | G06F 12/0817 711/141 |
| 2015/0043575 A1* | 2/2015 | Kumar | H04L 41/0823 370/390 |
| 2017/0168942 A1* | 6/2017 | Bernat | G06F 12/0815 |
| 2017/0371783 A1* | 12/2017 | Le | G06F 12/0831 |

OTHER PUBLICATIONS

International Preliminary Report on Patentability issued in Application No. PCT/US2020/062720, dated Jun. 16, 2022, 7 pages.
Extended European Search Report issued in U.S. Appl. No. 20/895,545, dated Nov. 22, 2023, 7 pages.

* cited by examiner

*Primary Examiner* — Michelle T Bechtold

(57) ABSTRACT

A processing system includes a plurality of compute units, with each compute unit having an associated first cache of a plurality of first caches, and a second cache shared by the plurality of compute units. The second cache operates to manage transfers of caches between the first caches of the plurality of first caches such that when multiple candidate first caches contain a valid copy of a requested cacheline, the second cache selects the candidate first cache having the shortest total path from the second cache to the candidate first cache and from the candidate first cache to the compute unit issuing a request for the requested cacheline.

20 Claims, 4 Drawing Sheets

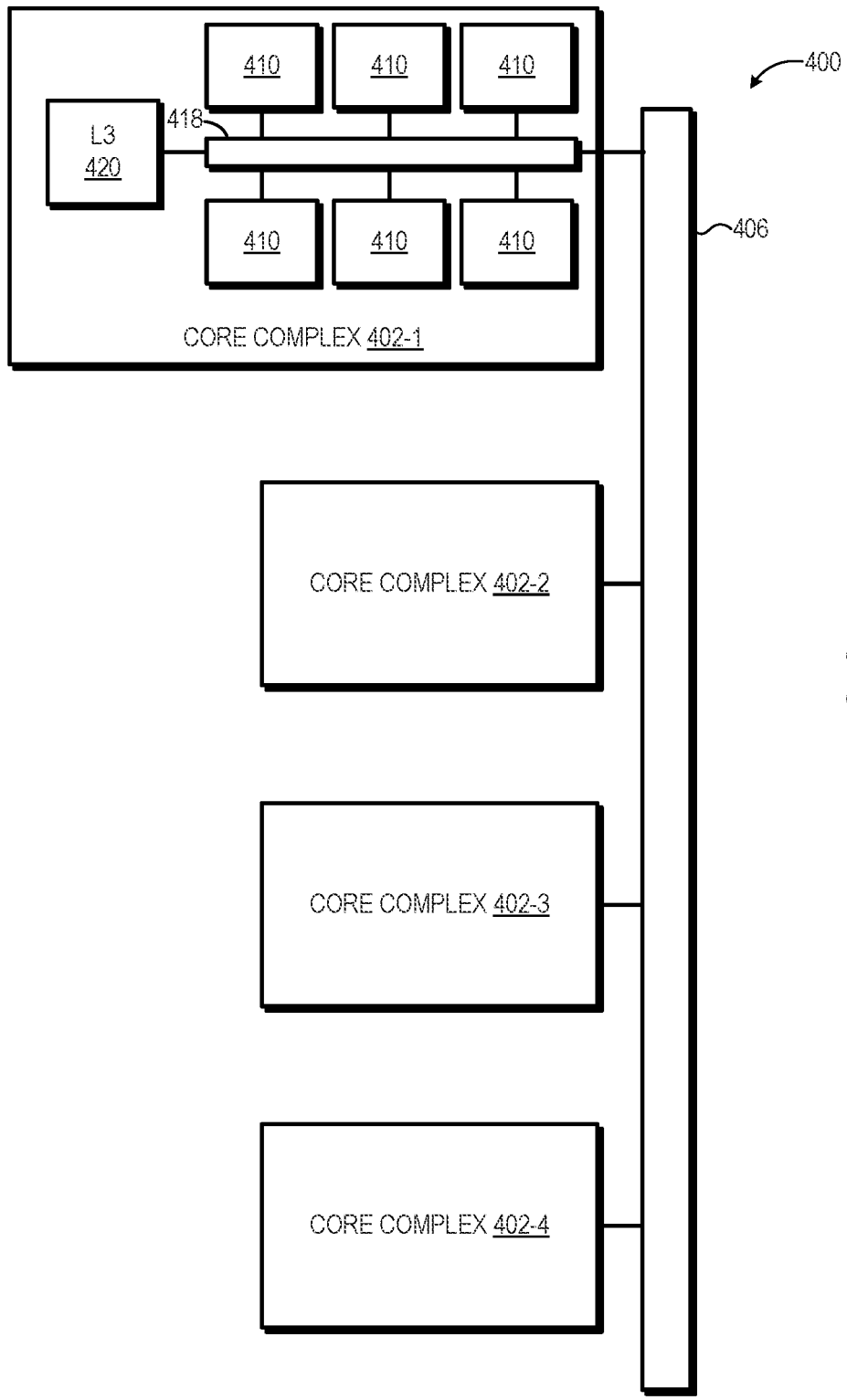

TRANSFER OF CACHELINES IN A PROCESSING SYSTEM BASED ON TRANSFER COSTS

CROSS-REFERENCE TO RELATED APPLICATIONS

The present application is a Continuation application of U.S. patent application Ser. No. 16/700,671, entitled "TRANSFER OF CACHELINES IN A PROCESSING SYSTEM BASED ON TRANSFER COSTS", and filed on Dec. 2, 2019, the entirety of which is incorporated by reference herein.

BACKGROUND

Some processing systems employ multiple processor cores with a private/shared coherent cache hierarchy in which each processor core has its own private cache while also sharing one or more other caches with the other processor cores in the system. To facilitate coherency in this type of private/shared cache hierarchy, the processing system relies on transfer of copies of cachelines between the private caches. In most conventional processing systems, when a requesting processor core does not have a specified cacheline in its private cache and the cacheline is not present in the shared cache, the system issues a cache miss and initiates a memory request to load the cacheline from memory for use by the requesting processor core. Some processing systems, however, employ a shadow tag memory in which the shared cache monitors the states of cachelines maintained at the private caches of the system, and thus can obtain a requested cacheline for one processor core from the private cache of another processor core based on the cacheline information maintained in the shadow tag memory.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

FIG. 4 is a block diagram illustrating a processing system having multiple core complexes implementing transfer-cost-based cacheline transfers in accordance with some embodiments.

DETAILED DESCRIPTION

Figure 1:
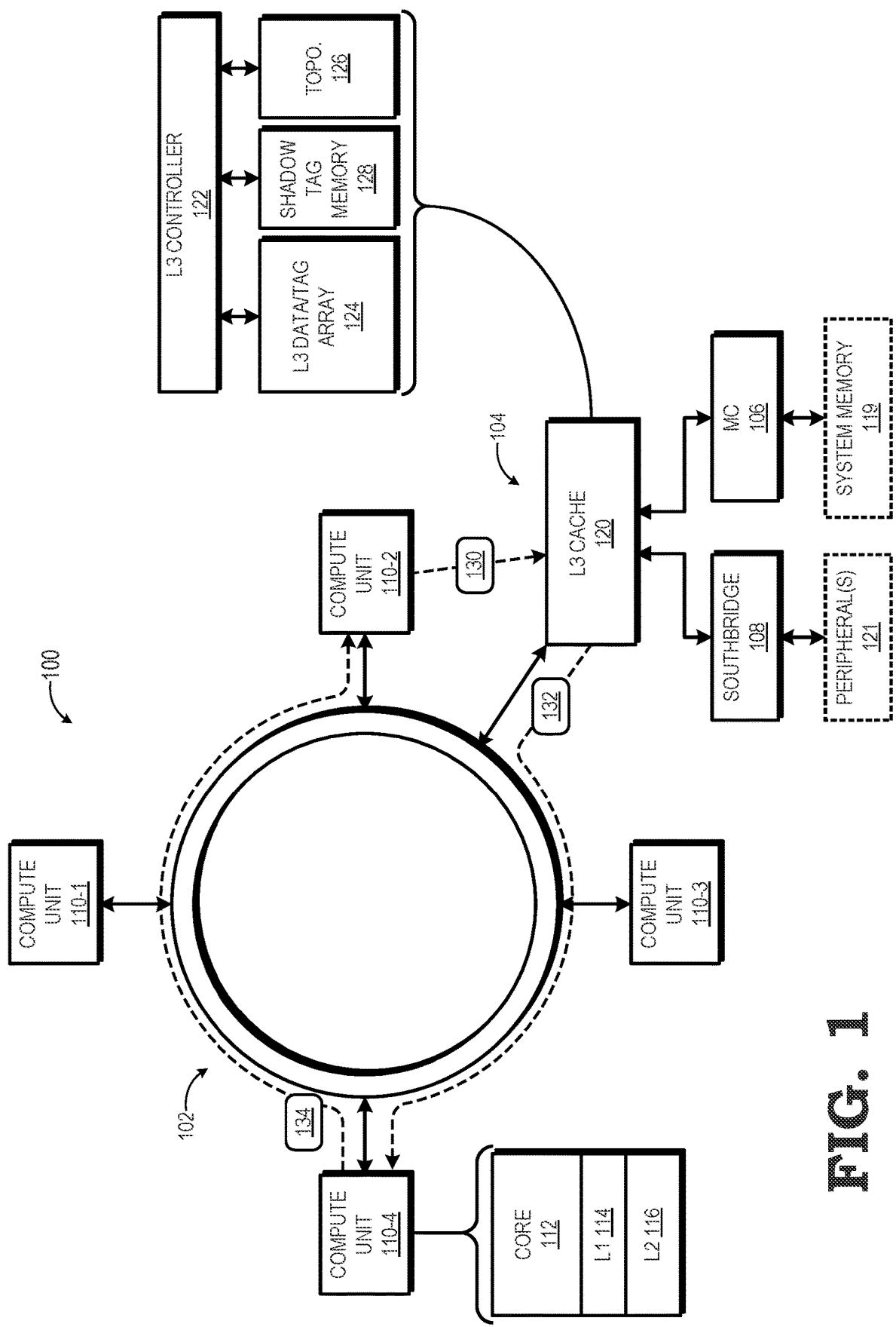
FIG. 1 is a block diagram of a processing system utilizing transfer-cost-based cacheline transfers in accordance with some embodiments.

A processing system employing a shadow tag memory or other mechanism for centrally monitoring cacheline status in private caches often uses this capacity to allow for transfer of cachelines from the private cache of one processor core to the private cache of another processor core and thus forgo the memory operations to otherwise obtain these cachelines from memory. However, conventional approaches for such cacheline transfers do not recognize or otherwise consider the reality that cacheline transfers often are not equal. To illustrate, two private caches can have a valid copy of a cacheline requested by a processor core, and in such cases a conventional system would arbitrarily select one of these private caches to satisfy the cacheline request. The process of doing such a transfer involves at least two operations: (1) the sending of a probe from the shared cache to one of the private caches and (2) the transfer of the cacheline from the probed private cache to the requesting processor core. However, due to the particulars of the topology of the one or more interconnects that connect the shared cache to these two private caches and connect these two private caches to the requesting processor core, the "distance" from the shared cache to a first private cache and then from the first private cache to the requesting processor core may be "shorter" than the "distance" from the shared cache to the second private cache and then from the second private cache to the requesting processor core, where the term "distance" in this context denotes the time spent for an operation to complete due at least in part to physical distance between the caches. As such, if the shared cache was to select the second private cache to satisfy the cacheline request, more time would be spent by the processing system to route a cache probe for the cacheline from the shared cache to the second private cache and then route the copy of the requested cacheline from the second private cache to the requesting processor core, than had the processing system performed the same probe-and-transfer process with the first private cache instead.

Accordingly, described herein are systems and techniques that provide improved cache-transfer efficiency for transfer of a cacheline between private caches through consideration of the particular topology connecting the private caches in the processing system. In at least one embodiment, the processing system includes a plurality of compute units, each compute unit including at least one processor core and at least one cache private to that compute unit (that is, a "private cache"). The processing system further includes a cache shared by the compute units (that is, a "shared cache") and which has access to a shadow tag memory that maintains the status of various cachelines stored in the private caches. The shared cache further has access to topology information that represents the topology of the one or more interconnects that connect the various compute units to the shared cache and to each other.

In response to receiving a cacheline request from a requesting compute unit, the shared cache determines whether it can satisfy the cacheline request directly. If not, the shared cache uses the shadow tag memory to identify whether a valid copy of the cacheline is present in any of the private caches. If a single private cache contains a valid copy, the shared cache issues a cache probe to the identified private cache to direct the private cache to transfer a copy of the cacheline to the requesting compute unit. If multiple private caches contain valid copies of the requested cacheline, the shared cache utilizes the topology information to determine a transfer cost for each of the private caches identified as containing a valid copy of the requested cacheline. In at least one embodiment, this transfer cost represents the "cost" of sending a probe request for the cacheline to the corresponding private cache via one or more interconnects connecting the shared cache to the corresponding private cache as well as the "cost" of then transmitting the requested cacheline from the corresponding private cache to the requesting compute unit via one or more interconnects connecting these two components. In some embodiments, the transfer cost is representative of time or duration, such as a number of clock cycles required for each interconnect segment of the shared-cache-to-private-cache-to-requesting-compute-unit path, as gleaned from the particular topology connecting the components. In other embodiments, the transfer cost includes consideration of both the time for completing the transfer given the topology, as well as other considerations. For example, in some embodiments, the time represented by the transfer path is scaled or otherwise modified based on what interconnects are traversed by the path. To illustrate, in a processing system having multiple compute units connected in compute complexes, and the compute complexes connected via a system interconnect shared by other components, it could be advantageous to overall processing efficiency to limit cacheline-transfer traffic on the system interconnect. Thus, a transfer cost for a given shared-cache-private-cache-requesting-compute-unit path can be scaled up when the path traverses the system interconnect, and thus favoring cacheline transfers that don't traverse the system interconnect, even when the path "distances" are equivalent.

FIG. 1 illustrates a processing system 100 employing transfer-cost-based cacheline transfers in accordance with some embodiments. The processing system 100 includes a compute complex 102, a cache hierarchy 104, a memory controller 106, and a southbridge 108. The compute complex 102 includes a plurality of compute units 110, such as the depicted four compute units 110-1, 110-2, 110-3, and 110-4. As illustrated with respect to compute unit 110-4, each compute unit 110 includes at least one processor core 112 and one or more private caches of the cache hierarchy 104 that are private to the one or more processor cores 112 of the compute unit 110, such as a private level 1 (L1) cache 114 and a private level 2 (L2) cache 116. The processor core 112 includes, for example, a central processing unit (CPU) core, a graphics processing unit (GPU) core, a digital signal processor (DSP) core, or a combination thereof.

The memory controller 106 operates as the interface between the cache hierarchy 104 and a system memory 119. Thus, data to be cached in the cache hierarchy 104 typically is manipulated as blocks of data referred to as "cachelines", and which are addressed or otherwise located in a memory hierarchy using a physical address of system memory 119. Cachelines are accessed from the system memory 119 by the memory controller 106 in response to memory requests from the cache hierarchy 104. Likewise, when a cacheline containing modified data is evicted from the cache hierarchy 104 and thus needs to be updated in the system memory 119, the memory controller 106 manages this write-back process. The southbridge 108 operates as the interface between the cache hierarchy 104, the memory controller 106, and one or more peripheral devices 121 of the processing system 100 (e.g., network interfaces, keyboards, mice, displays, and other input/output devices).

The components of the processing system 100 are interconnected via one or more interconnects. In the depicted embodiment, the compute units 110-1, 110-2, 110-3, and 110-4 are connected via a single interconnect 118, which is depicted and described in operation herein as a ring interconnect. Other examples of the interconnect 118 include a mesh interconnect, a crossbar, a grid interconnect, a two-dimensional or three-dimensional torus interconnect, a hierarchical ring interconnect, and the like. Note that in other embodiments, multiple interconnects are used to interconnect some or all of the compute units 110.

The cache hierarchy 104 includes two or more levels of caches. In the illustrated example, the cache hierarchy 104 includes three cache levels: level 1 (L1); level 2 (L2), and level 3 (L3). For L1 and L2, the core complex 102 implements the aforementioned private caches 114 and 116, respectively, of the compute units 110. For purposes of the following description, it is assumed that the private L1 caches 114 are completely private to each compute unit 110; that is, the cache hierarchy 104 does not maintain coherency between the private L1 caches 114 or between the private L1 caches 114 and the lower level caches, whereas each of the private L2 caches 116 is private to its corresponding compute unit 110, and the cache hierarchy 104 operates to maintain coherency between the private L2 caches 116 and thus permits cacheline transfers to and from the L2 caches 116. The private L2 caches 116 are, for example, direct-mapped or n-way set associative.

For the L3 caching level, the cache hierarchy 104 implements an L3 cache 120 that is shared by the compute units 110 of the core complex 102, and thus shared by at least the L2 caches 116. Accordingly, the L3 cache 120 is also referred to as "shared L3 cache 120" herein. The shared L3 cache 120 is illustrated as connected directly to the ring interconnect 118, but in other embodiments one or more other interconnects are disposed between the shared L3 cache 120 and the ring interconnect 118. The shared L3 cache 120 implements an L3 controller 122, an L3 data array having a plurality of indexes and a plurality of corresponding ways, each way to store a corresponding cacheline at the corresponding index, and an L3 tag array to store the tag information associated with each index/way. The L3 data array and L3 tag array are collectively illustrated, and referred to herein, as L3 data/tag array 124.

In at least one embodiment, the L3 cache 120 includes or otherwise has access to a topology datastore 126 to store topology information representative of the particular topology of the network of one or more interconnects (such as ring interconnect 118) interconnecting the compute units 110 and the L3 cache 120. In some embodiments, the topology information directly represents the physical topology of the interconnects, such as a data structure that represents where each of the compute units 110 and the L3 cache 120 are connected to the ring interconnect 118, the physical characteristics of the interconnect segments between components, such as the number of buffers or other gate delays, the physical distance of the wires of the interconnect segments, and the like. In other embodiments, the topology information instead represents transfer "cost" metrics between pairs of components, as determined in part on the physical topology of the network through modeling or simulation, empirical evaluation, and the like. The L3 cache 120 further includes or otherwise has access to a shadow tag memory 128 to store address and state information for cachelines of the L2 caches 116 (that is, to store "shadow tags" representative of the tag information of the L2 caches 116). The L3 cache 120 uses the shadow tag memory 128 to monitor the states of cachelines stored at the respective L2 caches 116 at the compute units 110, and thus the L3 cache 120 is able to identify which L2 cache(s) 116 contain a valid copy of a requested cacheline using the shadow tag memory 128. An example implementation of a shadow tag memory and its use in facilitating cacheline transfers is described in U.S. Pat. No. 10,073,776 (entitled "Shadow Tag Memory to Monitor State of Cachelines at Different Cache Level"), the entirety of which is incorporated by reference herein. Implementations of the topology datastore 126 and the shadow tag memory 128 are described in greater detail below.

In at least one embodiment the L3 cache 120 operates to facilitate transfers of cachelines between the L2 caches 116 of the compute units 110. Thus, when a compute unit 110 experiences a cache miss for a cacheline at its own local L1 cache 114 and L2 cache 116, the compute unit 110 sends a cacheline request (e.g., cacheline request 130) to the L3 cache 120 via the ring interconnect 118 or other connection. In response to receiving the cacheline request and in response to determining that the L3 data/tag array 124 not containing a valid copy of the requested cacheline, the L3 controller 122 uses the shadow tag memory 128 to determine which, if any, of the L2 caches 116 of the other compute units 110 has a valid copy of the requested cacheline. If no other L2 cache 116 contains a valid copy, then the L3 controller 122 initiates a memory request to obtain the requested cacheline from system memory 119. If one other L2 cache 116 contains a valid copy, then the L3 cache 120 sends a cache probe to the compute unit 110 having the identified L2 cache 116 to request that the copy of the cacheline be transferred from that compute unit 110 to the requesting compute unit 110.

However, in the event that the L3 cache 120 identifies from the shadow tag memory 128 that multiple L2 caches 116 contain a valid copy of the requested cacheline, then the L3 cache 120 operates to select one of the L2 caches 116 to service the cacheline request. In at least one embodiment, this selection process is based on an evaluation of the "transfer cost" of performing the cacheline transfer for each of the candidate L2 caches 116 identified as containing a valid copy of the cacheline. The transfer of a copy of the requested cacheline involves the transmission of a cache probe (e.g., cache probe 132) from the L3 cache 120 to the compute unit 110 having the selected L2 cache 116 (the "target compute unit 110" and the "target L2 cache 116", respectively) and then the transmission of a copy of the requested cacheline (e.g., cacheline copy 134) from the target compute unit 110 to the requesting compute unit 110. Accordingly, the transfer cost for transfer of a cacheline from a target compute unit 110 to a requesting compute unit is, in one embodiment, represented as a sum of a "distance metric" for the path between the L3 cache 120 and the target compute unit 110 and a "distance metric" for the path between the target compute unit 110 and the requesting compute unit 110. These "distance metrics" are reflected in, or calculated from, the topology information in the topology datastore 126 as, for example, numbers of clock cycles, numbers of interconnect segments, actual physical distances, scaling or other adjustments based on transfer policies, combinations thereof, and the like.

To illustrate, if compute unit 110-2 requests a cacheline for which both compute unit 110-1 and 110-4 have a valid copy, and if the ring interconnect 118 is bi-directional, and if only the number of node interconnect segments is considered in the "distance" calculations, the transfer cost for transferring a cacheline copy from compute unit 110-1 to compute unit 110-2 is lower than the transfer cost for transferring a cacheline copy from the compute unit 110-4 to compute unit 110-2. The former transfer requires only three "hops" (with "hop" referring to a traverse of an interconnect segment), with two hops for the cache probe from the L3 cache 120 to the compute unit 110-1 and one hop for transfer of the cacheline copy from the compute unit 110-1 to compute unit 110-2. In contrast, the latter transfer requires four hops, with two hops for the cache probe from the L3 cache 120 to the compute unit 110-4 and two hops for the transfer of the cacheline copy from the compute unit 110-4 to the compute unit 110-2. In more complex implementations, other topology parameters are considered, such as bandwidth or traffic on certain interconnect segments, the different transmission speeds of interconnect segments, and the like, and such considerations instead could result in the first transfer scenario having a higher transfer cost metric than that of the second transfer scenario.

After selecting a target L2 cache 116 to service the cacheline request based on evaluation of the transfer costs for the candidate L2 caches 116, the L3 cache 120 sends a cache probe (e.g., cache probe 132) to the target compute unit 110 having the target L2 cache 116 via the ring interconnect 118 to the target compute unit 110. This cache probe includes an identifier of the cacheline being requested (e.g., a memory address, or portion thereof, associated with the cacheline), a destination identifier of the requesting compute unit 110 (or requesting L2 cache of the requesting compute unit 110), and an identifier of the request that originated from the requesting compute unit. In response to receiving the cache probe, the target compute unit 110 uses the identifier of the requested cacheline to access a copy of the requested cacheline from the target L2 cache 116 and then forward the copy of the requested cacheline (e.g., cacheline copy 134) to the requesting compute unit 110 using a packet or other interconnect envelope with a destination identifier of the requesting compute unit 110 and an identifier of the request sent by requesting compute unit 110 included in the received cache probe 132.

Figure 2:
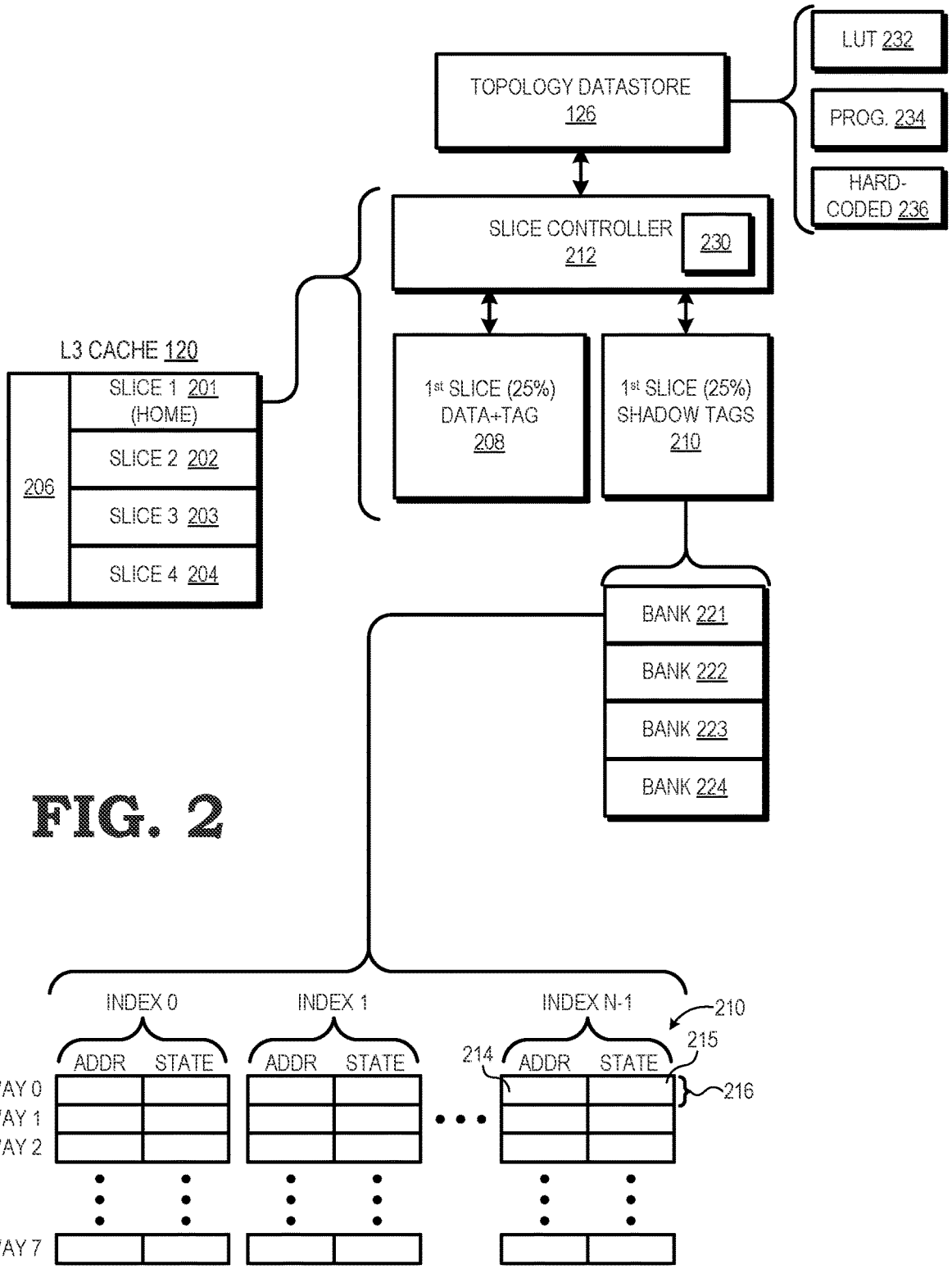
FIG. 2 is a block diagram illustrating a shared cache of the processing system of FIG. 1 in greater detail in accordance with some embodiments.

FIG. 2 illustrates an example implementation of the L3 cache 120, the topology datastore 126, and the shadow tag memory 128 in greater detail in accordance with some embodiments. The shadow tag memory 128 is implemented as a cache, array, table, latches, flops, or other storage configuration to include shadow tag entries hierarchically arranged as a plurality of "banks", a plurality of indices, and a plurality of ways. That is, each entry in the shadow tag memory 128 corresponds to a particular bank, index and way combination. Each shadow tag entry in the shadow tag memory 128 tracks information for a corresponding cacheline present in one of the L2 caches 116. The information stored at a shadow tag entry for the corresponding cacheline includes, for example, the physical address (or portion thereof) of the cacheline as well as state of the cacheline at the L2 cache 116. Each bank contains a plurality of indices and ways and represents the shadow tag entries used to track the cachelines present in one of the L2 caches 116.

For the example processing system 100 in which there are four compute units 110, each having a corresponding L2 cache 116, the shadow tag memory 128 includes four "banks," one for each of the four L2 caches 116. The L3 cache 120 is segmented into a plurality of "slices", with the illustrated example having four slices 201, 202, 203, 204 (also denoted as slices 1-4), and routing logic 206 to route communications to and from the respective slices based on how the address associated with each communication is located within the slices 1-4. Each slice represents a corresponding "slice" of the distribution of addresses used by the L2 caches 116. Each slice also represents corresponding "slice" of the shadow tag memory 128. Thus, as there are four slices in this example, each of slices 201-204 stores a corresponding 25% of the address space of the L2 caches 116 and a corresponding 25% of the entries of the shadow tag memory 128. To this end, as shown by the detailed view of slice 201, each slice includes an L3 data/tag slice 208, a shadow tag slice 210, and a slice controller 212. For slice 201, the L3 data/tag slice 208 has data and tag array entries for the first 25% of the L2 cache address range, whereas for slice 201 this is for the second 25% of the L2 cache address range, and so on. Similarly, for slice 201 the shadow tag slice 210 includes the first 25% of the indices of the shadow tag memory 128, for slice 202 the shadow tag slice 210 includes the second 25% of the indices of the shadow tag memory 128, and so on.

As noted, the shadow tag memory 128 is stored as a set of shadow tag slices 210, each having a corresponding portion of the overall address range that is associated with the shadow tag memory 128. Thus, each shadow tag slice 210 includes a plurality of banks, indices and ways. The number of banks in each shadow tag slice 210 corresponds to the number of L2 caches 116. Thus, because there are four L2 caches 116 in the example of FIG. 1, each shadow tag slice 210 includes four banks 221, 222, 223, 224 associated with L2 caches 116 of compute units 110-1, 110-2, 110-3, and 110-4, respectively, in this example. The associativity (that is, the number of ways) of a bank is the same as the associativity of the L2 cache associated with that bank. For example, if the L2 cache is eight-way associative, then each bank of the shadow tag memory 128 is also eight-way associative, that is, has eight ways. Conversely, if the L2 cache 116 is direct mapped, then each bank of shadow tag memory 128 is also direct mapped; that is each bank effectively is a one-way set associative cache. A particular combination of index and way in a given bank represents a shadow tag entry 216 that tracks a corresponding cacheline that is present in L2 cache 116. Each entry of the shadow tag memory 128 has an address field 214 to store at least a portion of an address (typically the upper bits of the physical address) of the cacheline associated with the entry 216 and a state field 215 to store state information for the cacheline. The state and address information stored in a corresponding entry 216 of the shadow tag memory 128 for a cacheline of an L2 cache typically reflects at least a subset of the tag information stored in the tag array of the L2 cache for that cacheline, and thus "shadows" the L2 cache's tag for this cacheline. As such, the state information in the shadow tag memory 128 of the L3 cache 120 can be viewed as "shadow tags" of the counterpart cacheline tags in the L2 caches 116.

Table 1 below illustrates an example format and utilization of the shadow tag entry 216 to represent the state information for a corresponding L2 cacheline.

TABLE 1

Shadow tag memory location Format

| Field Name | No. of Bits | Description | |
|---|---|---|---|
| Valid | 1 | Indicates a valid entry. | |
| L2State [3:0] | 4 | The coherency state of the cacheline cached at the associated L2 cache. | |
| L3Alloc [1:0] | 2 | L3 allocation property for L2-victims— used to indicate if L2-victim should be cached in L3 or not. | |
| | | Value | Meaning |
| | | 00 | Do not install L2-victim in L3. Treat these as L3-victim instead. |
| | | 01 | Install L2-victim in L3. |
| | | 10 | Install L2-victim in L3. |
| | | 11 | Install L2-victim in L3. |
| L2Tag [31:0] | 32 | The tag portion of the address of the cacheline cached in the corresponding L2 cache. | |

Thus, as shown by Table 1 the state information stored in the shadow tag entry 216 associated with a particular cacheline at a particular core/L2 cache includes not only a copy of the tag portion of physical address of the cacheline at this L2 cache, but also coherency state information for the cacheline, as well as allocation information to facilitate handling of eviction of the cacheline from the L2 cache. Additional details on implementing a shadow tag memory are found, for example, in the aforementioned U.S. Pat. No. 10,073,776.

Turning to the topology datastore 126, in one embodiment, one of the slices 201-204 (e.g., slice 201/slice 1) is designated as the "home" slice that operates to service all L2 cacheline transfers for the compute complex 102. Accordingly, the slice controller 212 of the designated home slice has access to the topology datastore 126 and implements a transfer cost component 230 to determine a transfer cost for a particular requesting compute unit/target compute unit pair. In other embodiments, the slices 201-204 are physically distributed around the one or more integrated circuit (IC) substrates such that some slices are physically closer to certain compute units than others. In such implementations, each slice may be associated with one or more proximal compute units such that that slice operates to service the L2 cacheline transfers initiated by the one or more compute units associated with that slice. Accordingly, reference herein to the L3 cache 120 performing an operation pertaining to a cacheline transfer, including receipt of a cacheline request, determination of the target compute unit based on lowest transfer cost considerations, and issuance of a cache probe to the target compute unit, refers to either the home slice 201 performing such operation in a centralized implementation, or to the local slice performing such operation in a distributed slice implementation.

As noted above, the topology information of the topology datastore 126 either represents the transfer costs for implementing a cacheline transfer between various requesting compute unit/target compute unit pairs, or represents the physical topology of the network of one or more interconnects linking such pairs, as well as linking the L3 cache 120 to the target compute units. To illustrate, Table 2 below depicts one example of the topology information as a table showing the total transfer cost metric "TF[X]" in terms of clock cycles (that is, from L3 cache 120 to the target compute unit and then from the target compute unit to the requesting compute unit) for each pairing of compute units 110.

TABLE 2

Example Total Transfer Costs (columns: target compute unit, rows: requesting compute unit):

| | 110-1 | 110-2 | 110-3 | 110-4 |
|---|---|---|---|---|
| 110-1 | — | TF1 | TF2 | TF3 |
| 110-2 | TF4 | — | TF5 | TF6 |
| 110-3 | TF7 | TF8 | — | TF9 |
| 110-4 | TF10 | TF11 | TF12 | — |

Thus, the total transfer cost metric for transfer of a cacheline from the L2 cache 116 of compute unit 110-2 to the L2 cache of compute unit 110-3 is TF8, whereas the total transfer cost metric for transfer of a cacheline from the L2 cache 116 of compute unit 110-3 to the L2 cache 116 of the compute unit 110-2 is TF5, which may be greater than, equal to, or less than TF8 depending on the particular topologies of the paths between these three components in their respective directions.

In other embodiments, the transfer cost metric of each interconnect segment of the transfer (that is, the first interconnect segment from the L3 cache 120 to the target compute unit 110 and the second interconnect segment from the target compute unit 110 to the requesting compute unit 110) is represented in the topology information, and the transfer cost component 230 determines the total transfer cost by summing the transfer cost metrics for each interconnect segment. Note that the transfer cost metric for a given interconnect segment, or for the entire transfer, can reflect not only the time (e.g., in terms of clock cycles) required for the probe request to travel from the L3 cache 120 to the target compute unit 110 and the time required for a cacheline copy to travel from the target compute unit 110 to the requesting compute unit 110 given the physical topology of the interconnects connecting these components (that is, the wire lengths, the number of buffers or other logic delays in the paths, etc.), but also can reflect certain policies, such as a weighting or scaling of the transfer costs to discourage cache transfer traffic over a busy or critical interconnect segment. In other embodiments, rather than reflect the transfer costs directly, the topology information instead directly represents the physical characteristics of the paths between components (such as the aforementioned wire lengths, number of gate/buffer delays, etc.) as well as weights or other mechanisms for scaling based on cacheline transfer policies, and the transfer cost component 230 accesses this information and then computes a transfer cost from these various parameters. As an example, the interconnect connecting compute units could be a grid or other mesh, and the transfer cost component 230 thus calculates a distance from the L3 cache 120 to the target compute unit and a distance from the target compute unit and the requesting compute unit within the mesh using a Manhattan distance algorithm or other well-known grid path distance algorithm.

For either the direct transfer-cost-based representation or a physical attribute representation in the topology information of the topology datastore 126, the topology information can be implemented in, for example, a look-up table (LUT) 232 that takes as inputs identifiers of the target and requesting compute units and outputs a value representative of the total transfer cost (or outputs values representative of the transfer cost of each interconnect segment) or outputs one or more values representative of the physical characteristics and policies for the interconnect segments that form the path between the L3 cache 120 and the target compute unit 110 and between the target compute unit 110 and the requesting compute unit 110. Alternatively, the topology information can be implemented in hardware logic, such as in the form of programmable logic 234 (e.g., fused logic, read-only memory (ROM), etc.) or in the form of hard-coded logic 236, that is programmed or designed to represent the pre-calculated transfer costs, which can be determined empirically, through modeling or simulation, and the like, or which is programmed or designed to reflect cost metrics representative of the physical attributes of the various transfer paths available.

Figure 3:
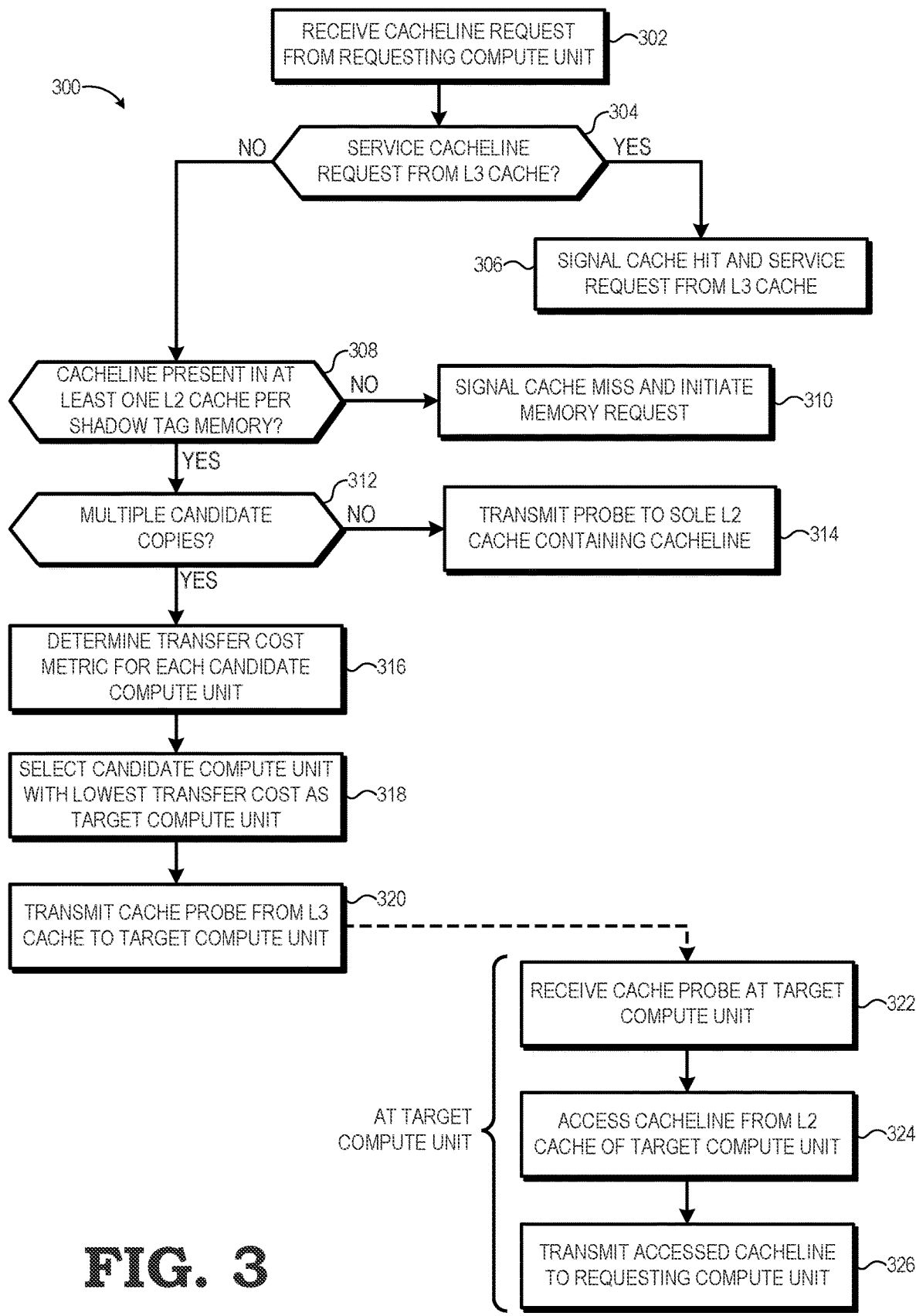
FIG. 3 is a flow diagram illustrating a method for implementing a cacheline transfer in the processing system of FIGS. 1 and 2 based on transfer cost considerations in accordance with some embodiments.

FIG. 3 illustrates a method 300 for performing a transfer-cost-based cacheline transfer in the processing system 100 of FIGS. 1 and 2 in accordance with some embodiments. At block 302, a compute unit 110 (e.g., compute unit 110-2 for purposes of the following description) determines that its L2 cache 116 does not contain a valid copy of a requested cacheline, and thus issues a cacheline request 130 (e.g., in the form of a cache probe) to the L3 cache 120. At block 304, the L3 cache 120 determines whether it is able to service the cacheline request directly; that is, whether a valid copy of the requested cacheline is present in the L3 data/tag array 124. If so, at block 306 the L3 cache 120 signals a cache hit and services the cacheline request 130 by transferring a copy of the cacheline as stored in the L3 data/tag array 124 to the requesting compute unit 110-2.

If the L3 cache 120 is unable to service the cacheline request, then at block 308 the L3 cache 120 uses the shadow tag memory 128 to determine whether any of the other L2 caches 116 contains a valid copy of the requested cacheline. If no other L2 cache 116 contains a valid copy, then at block 310 the L3 cache 120 signals a cache miss. In at least one embodiment, this cache miss then triggers the L3 cache 120 to initiate a memory request to obtain the requested cacheline from the system memory 119, whereupon the requested cacheline is then provided to the requesting compute unit 110-2 (and also, in some instances, inserted into the L3 cache 120). If, however, a valid copy is present in the other L2 caches 116, at block 312 the L3 cache 120 determines whether there are multiple valid copies in multiple L2 caches 116, or if a valid copy is found in only a single other L2 cache 116. If there is only one other L2 cache 116 containing a valid copy of the requested cacheline, then at block 314 the L3 cache 120 forwards a cache probe to this identified L2 cache 116, with the cache probe containing an identifier of the requesting compute unit 110-2 and an address portion or other identifier of the cacheline being sought. In response to receiving the cache probe, the identified compute unit responds with data for the requested cacheline to the requesting compute unit 110-2 based on the identifier contained in the cache probe.

Otherwise, if multiple candidate L2 caches 116 are identified by the L3 cache 120 as having a valid copy of the requested cacheline at block 312, then at block 316 the L3 cache 120 determines a transfer cost for each candidate L2 cache 116 of the identified set. As explained above, the transfer cost for a candidate L2 cache 116 represents, at least in part, the sum of the time incurred in transmitting a cacheline request (e.g., cache probe 132, FIG. 1) from the L3 cache 120 to the candidate L2 cache 116 via one or more interconnects and the time incurred in transmitting a copy of the requested cacheline (e.g., cacheline copy 134, FIG. 1) from the candidate L2 cache 116 to the requesting compute unit 110 (in this example, compute unit 110-2). As further noted above, the transfer cost also can reflect one or more policies regarding cacheline transfers, such as a policy to favor a particular interconnect or to disfavor a particular segment of an interconnect, which can manifest in the transfer cost as, for example, a scaling value applied via multiplication to an initial transfer cost or a value summed with the initial transfer cost. In some implementations, the transfer cost further includes and reflects differences in estimated power consumption required to complete the cacheline transfer for each candidate L2 cache 116, particularly in situations with processor cores of different sizes or complexity. Still other parameters used in transfer cost calculations can include the usage, backup, or available bandwidth on the interconnect(s) or the L2 caches 116 with the goal to try to spread traffic to the less busy interconnects or L2 caches 116, the clock frequencies implemented at the L2 caches 116 or their associated processor cores 112 as indicators of likely speed of cacheline request turnaround, the current power/temperature parameters of the various compute units 110 so as to favor a candidate L2 cache 116 that is less at risk of exceeding its corresponding power budget, and thread priorities, task priorities, or other indicators of execution priority at the various compute units 110 with the intent to favor a candidate L2 cache 116 that is associated with a lower-priority processor core 112 than one associated with a higher-priority processor core 112. Moreover, although one embodiment in which the states of cachelines in the L2 caches 116 are monitored by the shared L3 cache 120, in other embodiments at least some of the cachelines of the L1 caches 114 of at least some of the compute units 110 are also monitored by the shared L3 cache 120, and in such instances the candidate target caches can include the monitored L1 caches 114, and thus an L1 cache 114 having a "distance" of, say, 5 would, everything else being equal, be selected over an L2 cache 116 having a distance of, say, 7.

In some embodiments, the transfer cost metric for each interconnect segment of the L3 cache-target compute unit-requesting compute unit path is precalculated and implemented in the topology datastore 126 as, for example, the LUT 232, the programmable logic 234, the hard-coded logic 236, or combination thereof. In such instances, the transfer cost component 230 provides identifiers of the candidate compute unit and requesting compute units as inputs, and receives as outputs either a total transfer cost metric for the entire path, or a transfer cost metric for each interconnect segment of the path, which then are summed to obtain the total transfer cost metric. In other embodiments, a representation of the physical topology is represented in the topology datastore 126, in which case the transfer cost component 230 provides the same identifiers, and receives as output the topology data for the path, from which the transfer cost component 230 then computes a transfer cost for transferring the requested cacheline from the candidate compute unit to the requesting compute unit.

At block 318, the transfer cost component 230 of the L3 cache 120 identifies the candidate compute unit 110 having the shortest total path, as represented by the lowest transfer cost, for the requested cacheline as the target compute unit 110 for transferring a copy of the cacheline. In the event of a tie in the lowest transfer cost between two or more candidate compute units 110, the transfer cost component 230 can use any of a variety of tie-breaker selection processes, such as always selecting the one closest to the L3 cache 120, selecting one at random, based on a predetermined prioritization order, tracking previous selections and selecting one in order to balance out cacheline transfer workloads, and the like. At block 320, the L3 cache 120 then transmits a cache probe 132 to the selected target compute unit 110 (compute unit 110-4 in the example of FIG. 1) via the ring interconnect 118, with the cache probe 132 including both an identifier of the cacheline being sought and an identifier of the requesting compute unit 110-2.

At block 322, the target compute unit 110-4 receives the cache probe 132 via the ring interconnect 118. In response, at block 324 the target compute unit 110-4 uses the identifier of the requested cacheline from the cache probe 132 to access the local copy of the requested cacheline from the L2 cache 116 of the target compute unit 110-4, and at block 326 the target compute unit 110-4 generates a packet or other interconnect envelope containing the access cacheline copy (e.g., cacheline copy 134) and the identifier of the requesting compute unit 110-2 as the destination identifier, and transmits this packet to the requesting compute unit 110-2 via the ring interconnect 118. The requesting compute unit 110-2 then accesses the cacheline copy 134 from the received packet and inserts the cacheline copy 134 into its local L2 cache 116 for access and use by the compute unit 110-2.

Although the processing system 100 of FIG. 1 illustrates an example implementation in which a single interconnect (ring interconnect 118) is used to connect all of the compute units 110 and the shared L3 cache 120, the same transfer-cost-based cacheline transfer technique described above can be employed in systems having multiple interconnects. To illustrate, FIG. 4 depicts a processing system 400 having a plurality of core complexes 402 (e.g., four core complexes 402-1, 402-2, 402-3, and 402-4) interconnected via a system-level interconnect 406. Each core complex 402, in turn, includes a plurality of compute units 410 and a locally-shared L3 cache 420 connected via a local interconnect 418, and in which each L3 cache 420 includes a shadow tag memory (e.g., shadow tag memory 128, FIG. 1) that maintains the cacheline status information for each L2 cache (e.g., L2 cache 116, FIG. 1) of each compute unit 410 in each of the core complexes 402 (or some partitioned subset thereof) and a topology datastore (e.g., topology datastore 126, FIG. 1) that contains topology information representative of not only the local interconnect 418 of that core complex 402, but also the system-level interconnect 406 and the other local interconnects 418 of the other core complexes 402. In this implementation, the processing system 400 performs cacheline transfers not only between the compute units 410 local to the same core complex 402, but also between compute units 410 of different core complexes 402. As such, a cache request from a compute unit 410 of a given core complex 402 is routed to the L3 cache 420 local to that core complex 402. In response to a cache miss at this L3 cache 420, the L3 cache 420 then identifies whether any of the local compute units 410 or any of the remote compute units 410 maintain a valid copy of the requested cacheline, and if there are multiple candidate target compute units, determines the transfer cost for each candidate target compute unit, whether local or remote, and selects the appropriate target compute unit for servicing the cacheline request accordingly. In the context of processing system 400, the determination of a transfer cost for a candidate compute unit considers whether the compute unit is local or remote, and if remote, the additional "distance" presented by path through the system interconnect 406 and through the local interconnect 418 of the remote core complex 402 containing the candidate compute unit 410, along with any policy information, such as a scaling value representative of a preference to limit cacheline-transfer traffic on the system-level interconnect 406 when prudent.

In some embodiments, the apparatus and techniques described above are implemented in a system including one or more integrated circuit (IC) devices (also referred to as integrated circuit packages or microchips), such as the processing systems 100 and 400 described above with reference to FIGS. 1-4. Electronic design automation (EDA) and computer-aided design (CAD) software tools often are used in the design and fabrication of these IC devices. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code includes instructions, data, or a combination of instructions and data. The software instructions representing a design tool or fabrication tool typically are stored in a computer-readable storage medium accessible to the computing system. Likewise, the code representative of one or more phases of the design or fabrication of an IC device is either stored in and accessed from the same computer-readable storage medium or a different computer-readable storage medium.

A computer-readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium can be in source code, assembly language code, object code, or other instruction format that is interpreted or otherwise executable by one or more processors.

In accordance with one aspect, a processing system includes a plurality of compute units, each compute unit including at least one processor core and at least one private cache of a plurality of private caches, each private cache configured to store a corresponding set of cachelines. The processing system further includes a shared cache that is shared by the plurality of compute units and coupled to the plurality of compute units via one or more interconnects. The shared cache is configured to: in response to receipt of a request for an identified cacheline from a requesting compute unit, identify a subset of the plurality of private caches that has a valid copy of the identified cacheline; identify the private cache of the subset having a lowest transfer cost for providing a valid copy of the identified cacheline to the requesting compute unit; and transmit a probe request to a target compute unit having the identified private cache via at least one interconnect of the one or more interconnects. In response to receipt of the probe request, the target compute unit is configured to transfer a valid copy of the identified cacheline to the requesting compute unit via at least one interconnect of the one or more interconnects. In some embodiments, the shared cache is configured to identify which private cache of the subset has the lowest transfer cost by: determining, for each private cache of the subset, a corresponding transfer cost metric that represents a sum of a first distance metric and a second distance metric, the first distance metric representing a distance between the shared cache and the private cache via the one or more interconnects and the second distance metric representing a distance between the private cache and the requesting compute unit; and identifying the private cache having the lowest corresponding transfer cost metric as the private cache with the lowest transfer cost.

In accordance with another aspect, a method is provided for cacheline transfers in a system comprising a plurality of compute units and a shared cache, each compute unit including at least one private cache of a plurality of private caches. The method includes, in response to a request for an identified cacheline from a requesting compute unit, identifying, at the shared cache, a subset of the compute units that have a valid copy of the identified cacheline. The method further includes identifying, at the shared cache, the private cache of the subset having a lowest transfer cost for providing a valid copy of the identified cacheline to the requesting compute unit, and transmitting a probe request from the shared cache to a target compute unit having the identified private cache via at least one interconnect of the one or more interconnects. The method further includes in response to receipt of the probe request, transmitting a valid copy of the identified cacheline from the target compute unit to the requesting compute unit via at least one interconnect of the one or more interconnects. In some embodiments, identifying which private cache of the subset has the lowest transfer cost includes determining, for each private cache of the subset, a corresponding transfer cost metric that represents a sum of a first distance metric and a second distance metric, the first distance metric representing a distance between the shared cache and the private cache via the one or more interconnects and the second distance metric representing a distance between the private cache and the requesting compute unit, and identifying the private cache having the lowest corresponding transfer cost metric as the private cache with the lowest transfer cost.

In accordance with yet another aspect, a processing system includes a plurality of compute units, each compute unit having an associated first cache of a plurality of first caches. The processing system further includes a second cache shared by the plurality of compute units. The second cache is configured to manage transfers of caches between the first caches of the plurality of first caches such that when multiple candidate first caches contain a valid copy of a requested cacheline, the second cache selects the candidate first cache having the shortest total path from the second cache to the candidate first cache and from the candidate first cache to the compute unit issuing a request for the requested cacheline. In some embodiments, the shortest total path considers both physical characteristics of interconnect segments of the total path and one or more policies pertaining to the interconnect segments of the total path.

Note that not all of the activities or elements described above in the general description are required, that a portion of a specific activity or device may not be required, and that one or more further activities can be performed, or elements included, in addition to those described. Still further, the order in which activities are listed is not necessarily the order in which the activities are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A processing system comprising:
a plurality of compute units, each compute unit having a private cache; and
a shared cache coupled to the plurality of compute units, wherein the shared cache is configured to:
transfer a valid copy of a requested cacheline from a private cache of a compute unit of the plurality of compute units having a lowest transfer cost to a private cache of a requesting compute unit of the plurality of compute units, the lowest transfer cost is identified based on each distance between the requesting compute unit and the private caches having a valid copy of the requested cacheline and based on each corresponding distance between the shared cache and the private caches having a valid copy of the requested cacheline.

2. The processing system of claim 1, wherein:
the lowest transfer cost is based on a combination of a first distance metric result calculated based on each distance between the requesting compute unit and the private caches having a valid copy of the requested cacheline and a second distance metric result calculated based on each distance between the shared cache and the private caches having a valid copy of the requested cacheline.

3. The processing system of claim 2, wherein:
the first distance metric result and the second distance metric result each indicate a corresponding number of clock cycles associated with the processing system.

4. The processing system of claim 2, wherein:
the lowest transfer cost is based on topology information representing a topology of the compute units.

5. The processing system of claim 4, wherein:
the topology information further represents one or more policies regarding transfer of cachelines via one or more interconnects.

6. The processing system of claim 4, wherein:
the topology information is implemented as a look-up table accessible by the shared cache.

7. The processing system of claim 4, wherein:
the topology information is implemented as hardware logic accessible by the shared cache.

8. The processing system of claim 7, wherein:
the hardware logic is one of hard-coded logic or programmable logic.

9. The processing system of claim 4, wherein:
the topology information includes information representing at least one of:
a representation of a physical topology of paths between the plurality of compute units;
characteristics of one or more interconnects; and
at least one policy for transferring cachelines.

10. The processing system of claim 1, further comprising:
a shadow tag memory accessible by the shared cache,
wherein the shared cache is to identify a subset of private caches of the plurality of compute units having a valid copy of the requested cacheline using the shadow tag memory.

11. A method comprising:
in response to a request for an identified cacheline from a requesting compute unit of a plurality of compute units, each of the plurality of compute units associated with a corresponding private cache:
identifying, at a shared cache, a private cache having a lowest transfer cost for providing a valid copy of the identified cacheline to the requesting compute unit, the lowest transfer cost is identified based on each distance between the requesting compute unit and the private caches having a valid copy of the identified cacheline and based on each corresponding distance between the shared cache and the private caches having a valid copy of the identified cacheline; and
transferring the valid copy of the identified cacheline from the identified private cache.

12. The method of claim 11, wherein: the lowest transfer cost is further based on a summation of a first distance metric and a second distance metric.

13. The method of claim 12, wherein:
the first distance metric and the second distance metric each indicate a corresponding number of clock cycles associated with a processing system that includes the plurality of compute units.

14. The method of claim 12, wherein:
the lowest transfer cost is based on topology information representing a topology of the compute units.

15. The method of claim 14, wherein:
the topology information further represents one or more policies regarding transfer of cachelines via one or more interconnects.

16. The method of claim 14, wherein:
the topology information includes information representing at least one of:
a representation of a physical topology of paths between the plurality of compute units;
characteristics of one or more interconnects; and
at least one policy for transferring cachelines.

17. The method of claim 11, further comprising:
identifying a subset of corresponding private caches of the plurality of compute units having a valid copy of the identified cacheline.

18. The method of claim 17, wherein:
identifying the subset of corresponding private caches of the plurality of compute units comprises:
identifying the subset using a shadow tag memory accessible to the shared cache.

19. A processing system comprising:
a plurality of compute units, each compute unit having an associated cache of a plurality of first caches; and
a cache shared by the plurality of compute units,
wherein a third cache is configured to transfer a valid copy of a requested cacheline from a first cache of the plurality of first caches having a lowest transfer cost to a second cache of the plurality of first caches, wherein the second cache is associated with a requesting compute unit, and wherein the lowest transfer cost is identified based on each distance between the requesting compute unit and the plurality of first caches having a valid copy of the requested cacheline and based on each corresponding distance between the third cache and the plurality of first caches having a valid copy of the requested cacheline.

20. The processing system of claim 19, wherein:
the lowest transfer cost is based on one or more policies associated with interconnect segments of a path between the first cache and the second cache of the plurality of first caches.

* * * * *